(12) United States Patent
Oka et al.

(10) Patent No.: US 8,636,368 B2
(45) Date of Patent: Jan. 28, 2014

(54) PROJECTION DISPLAY APPARATUS AND ACTUATION CONTROL METHOD THEREOF

(75) Inventors: Kiyohiro Oka, Kanagawa (JP); Kenichiro Kuroda, Kanagawa (JP)

(73) Assignee: Sony Corporation (JP)

( * ) Notice: Subject to any disclaimer, the term of this patent is extended or adjusted under 35 U.S.C. 154(b) by 703 days.

(21) Appl. No.: 12/583,829

(22) Filed: Aug. 26, 2009

(65) Prior Publication Data

US 2010/0053572 A1    Mar. 4, 2010

(30) Foreign Application Priority Data

Sep. 3, 2008    (JP) ................. P2008-225979

(51) Int. Cl.
*G03B 21/14*    (2006.01)

(52) U.S. Cl.
USPC .......................................................... 353/101

(58) Field of Classification Search
USPC ................................................ 353/100, 101
See application file for complete search history.

(56) References Cited

U.S. PATENT DOCUMENTS

2004/0080836 A1*  4/2004  Miyashita et al. ............ 359/805
2009/0027633 A1*  1/2009  Tsao et al. .................... 353/121

FOREIGN PATENT DOCUMENTS

| JP | 2002072351 A | 3/2002 |
|----|---|---|
| JP | 2005055644 A | 3/2005 |
| JP | 2005062852 A | 3/2005 |
| JP | 2005-173460 A | 6/2005 |
| JP | 3960384 B2 | 5/2007 |
| JP | 2007-163916 A | 6/2007 |
| JP | 2008020924 A | 1/2008 |

OTHER PUBLICATIONS

Office Action from Japanese Application No. 2008-225979, dated Sep. 25, 2012.

* cited by examiner

*Primary Examiner* — Thanh Luu
*Assistant Examiner* — Danell L Owens
(74) *Attorney, Agent, or Firm* — Lerner, David, Littenberg, Krumholz & Mentlik, LLP

(57) ABSTRACT

A projection display apparatus and an actuation control method thereof are provided. A projection display apparatus includes an apparatus body that forms an optical image projected on a screen, a projection lens that projects the optical image formed by the apparatus body on the screen, a lens actuator that allows the projection lens to be shifted in a vertical direction or in a horizontal direction relative to the apparatus body, and a shift controller that limits a range of shift movement by the lens actuator such that a center position of the projection lens does not go outside of a quadrangle region of which the intersection point of diagonals is located coaxially with the position of the optical axis of the apparatus body.

6 Claims, 11 Drawing Sheets

FIG. 3
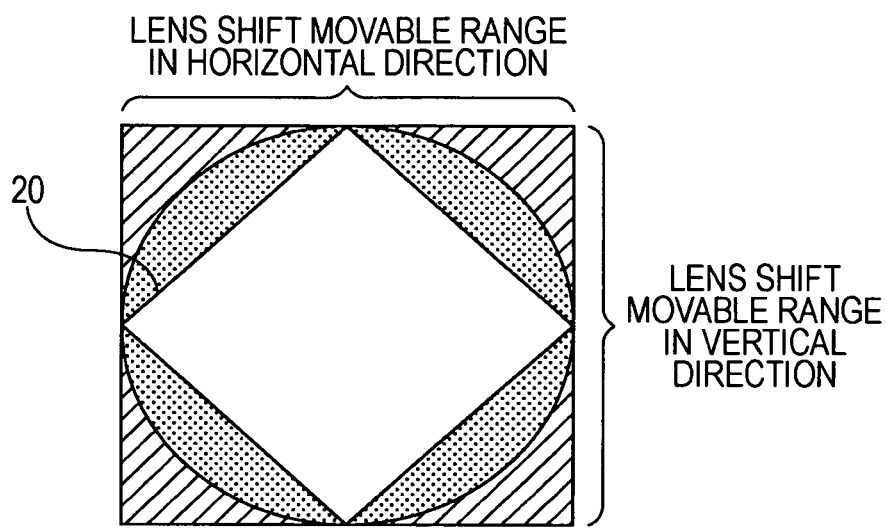
 MOVABLE RANGE IN WHICH PICTURE DEFECTS OCCUR
 RANGE IN WHICH NO PICTURE DEFECTS OCCUR
 RANGE WITHIN WHICH ACTUAL MOVEMENT IS LIMITED FIG. 12
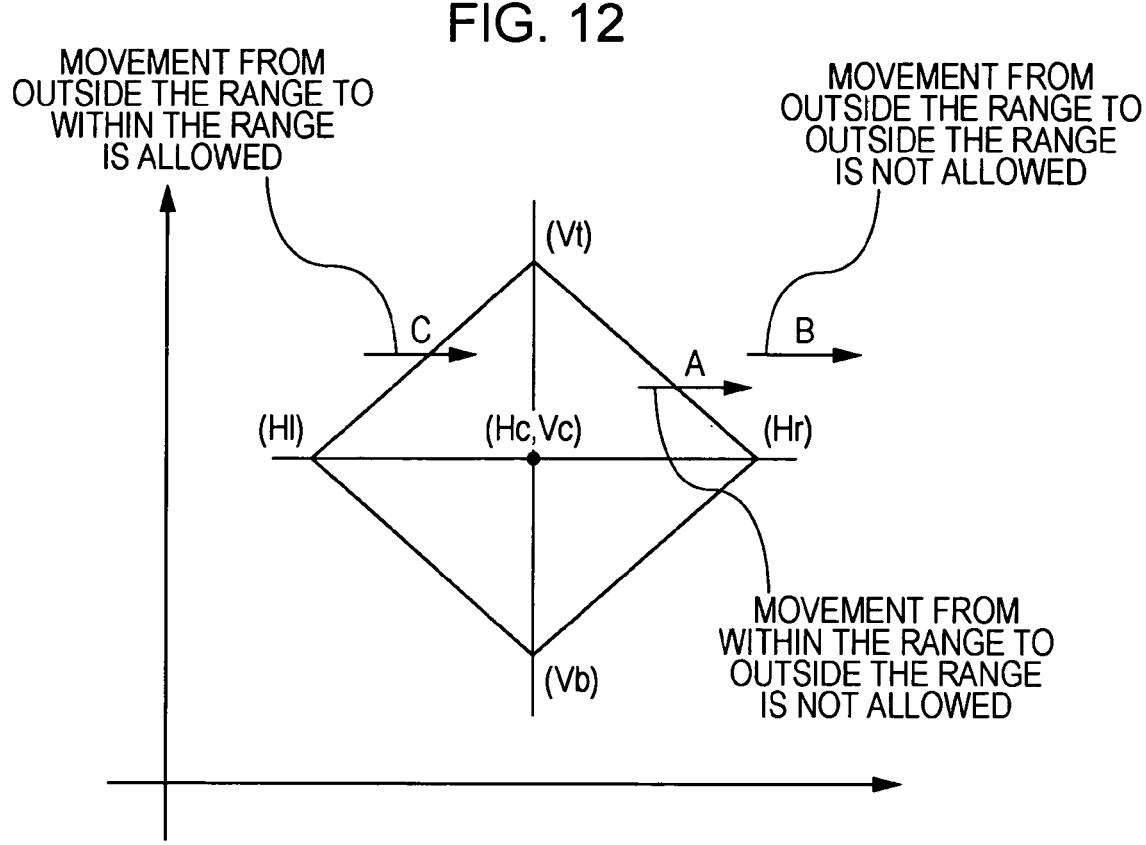
FIG. 13
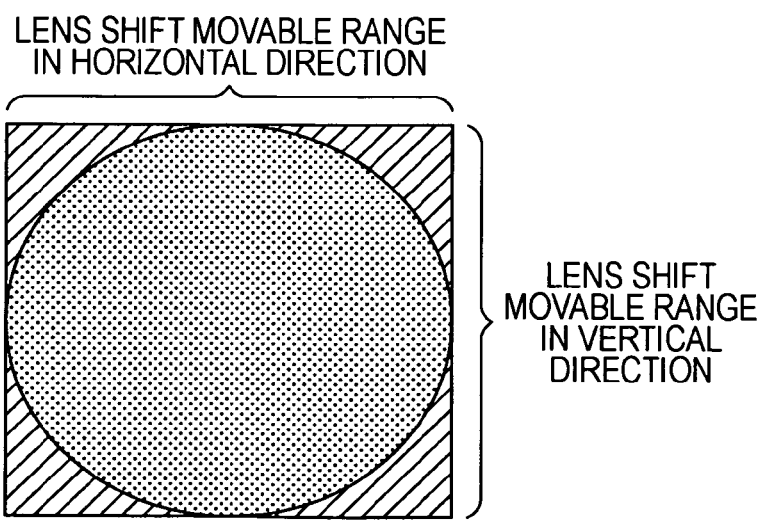
 MOVABLE RANGE IN WHICH PICTURE DEFECTS OCCUR
 RANGE IN WHICH NO PICTURE DEFECTS OCCUR

PROJECTION DISPLAY APPARATUS AND ACTUATION CONTROL METHOD THEREOF

CROSS-REFERENCE TO RELATED APPLICATION

The present application claims priority from Japanese Patent Application No. JP 2008-225979 filed in the Japanese Patent Office on Sep. 3, 2008, the entire content of which is incorporated herein by reference.

BACKGROUND OF THE INVENTION

1. Field of the Invention

The present invention relates to a projection display apparatus for displaying a projected image on a screen and an actuation control method thereof.

2. Description of the Related Art

In recent years, liquid crystal projectors have become quite popular as a projection display apparatus for displaying a projected image. The liquid crystal projector is configured to modulate light emitted from a light source by using a liquid crystal panel and form an optical image in accordance with image signals, and then display the optical image that is enlarged by a projection lens on a screen.

For a liquid crystal projector having such a configuration, it has been proposed that a projection lens is vertically and horizontally shifted in a plane normal to the projected optical axis, to thereby enable adjustment of the position of an image display on a screen. However, when shifting the projection lens for a long distance (i.e., the motion quantity is large), part of the projection lens may undesirably go outside of a display panel of a liquid crystal panel which is a light modulating element, resulting in the occurrence of a so-called "picture defect," loss of a projected image on a screen. To avoid this, when shifting a projection lens, it is desirable to prevent the occurrence of picture defects by limiting two-dimensional shift quantity in the vertical and horizontal directions.

In the case where a projection lens is two-dimensionally shifted as shown in, for example, FIG. 13, a movable range of the projection lens describes a rectangular shape, whereas a range in which no picture defects occur describes a circular or elliptical shape. Therefore, it is desirable that the two-dimensional shift quantity of the projection lens may be limited such that the center of the projection lens does not go outside of the circular or elliptical range, in which no picture defects occur (see, for example, Japanese Unexamined Patent Application Publication No. 2005-173460).

SUMMARY OF THE INVENTION

However, in the case where the shift quantity of a projection lens is to be limited so that the projection lens does not go outside of the circular or elliptical range, the control processing for shifting the projection lens may not be performed easily with a simple configuration. This is because complex arithmetic processing using a quadratic expression for the circular or elliptical shape may be necessary, in order to specify a boundary between a range of the circular or elliptical shape and a range outside thereof. That is, since complex arithmetic processing using a quadratic expression is necessary to limit the shift quantity of the projection lens, a great deal of time and a central processing unit with high processability may be undesirably necessary.

It is desirable to simplify the control for shifting a projection lens, to thereby provide a projection display apparatus of which control processing is easily performed with a simple configuration as well as to provide an actuation control method of the projection display apparatus.

According to an embodiment of the present invention, there is provided a projection display apparatus which includes an apparatus body that forms an optical image projected on a screen, a projection lens that projects the optical image formed by the apparatus body on the screen, a lens actuator that allows the projection lens to be shifted in a vertical direction or in a horizontal direction relative to the apparatus body, and a shift controller that limits a range of shift movement by the lens actuator such that a center position of the projection lens does not go outside of a quadrangle region of which the intersection point of diagonals is located coaxially with the position of the optical axis of the apparatus body.

In the projection display apparatus having the above configuration, when shifting the projection lens, the range of the shift movement of the projection lens is limited so that the center position of the projection lens does not go outside of a quadrangle region of which the intersection point of diagonals is located coaxially with the position of the optical axis of the apparatus. Therefore, the boundary between the quadrangle region and the region outside thereof is defined by straight lines which are constituent sides of the quadrangle region. That is, the boundary is specified by arithmetic processing using a primary expression for the straight lines, and thus processing load for the arithmetic processing may be reduced as compared with the case where arithmetic processing using a quadratic expression is used. Additionally, if the quadrangle region is set such that a circumscribed circle or a circumscribed ellipse of the quadrangle region respectively coincides with a circular range or an elliptical range which is a movable range where no picture defects occur, picture defects may be prevented by limiting the shift movement of the projection lens so that it does not go outside of the quadrangle region.

BRIEF DESCRIPTION OF THE DRAWINGS

FIG. 3 is an explanatory view showing an overview of an actuation control method according to an embodiment of the invention;

FIG. 12 is an explanatory view showing one embodiment of control for shift movement by an actuation control method according to an embodiment of the invention; and FIG. 13 is an explanatory view showing a concept of a limit range of movement in the related art.

DESCRIPTION OF THE PREFERRED EMBODIMENTS

Hereinafter, a projection display apparatus and an actuation control method thereof according to embodiments of the invention will be described with reference to drawings. Below, as a projection display apparatus, a liquid crystal projector will be described.

[Description of General Configuration of Projection Display Apparatus]

Figure 1:
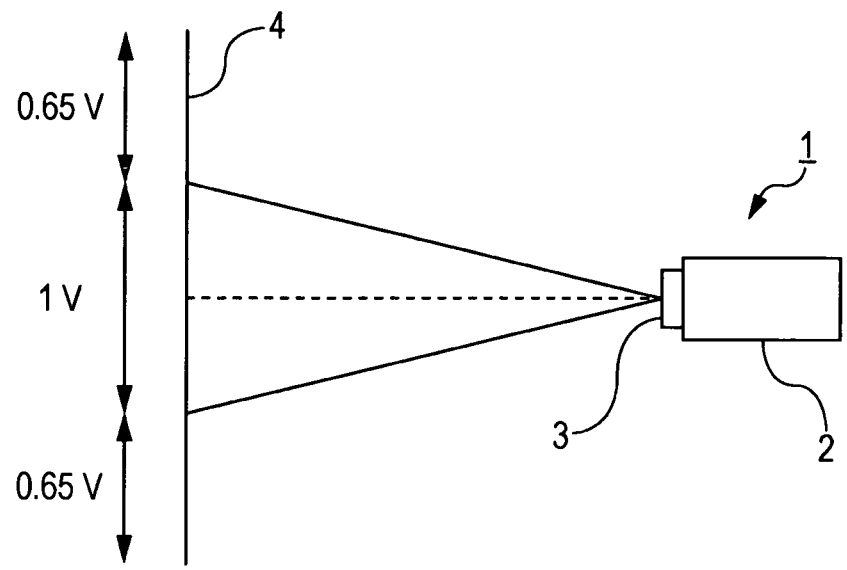
FIG. 1 is a schematic diagram showing a schematic configuration of a liquid crystal projector according to an embodiment of the invention.

FIG. 1 is a schematic diagram showing a schematic configuration of a liquid crystal projector according to an embodiment of the invention. A liquid crystal projector 1 includes, within an apparatus body 2, a light source, a dichroic mirror, a liquid crystal panel, a dichroic prism, or the like (all the components are not shown). An output light from the light source is split into each color component light of RGB by the dichroic mirror, and each color component light is modulated by the liquid crystal panel and an optical image in accordance with image signals is formed, and then each component light which is light-modulated is synthesized by the dichroic prism as necessary. That is, the apparatus body 2 of the liquid crystal projector 1 is configured to form an optical image projected on a screen 4.

On one surface of the apparatus body 2, a projection lens 3 is provided. The projection lens 3 is configured to project the optical image formed by the apparatus body 2 on the screen 4. Additionally, as will be described in detail below, the projection lens 3 is arranged such that it is shifted vertically and horizontally in a plane normal to a projected axis.

Incidentally, each component as described may be achieved by using related art, and therefore the description in detail thereof is omitted herein.

[Description of Main Parts of Projection Display Apparatus]

Figure 2:
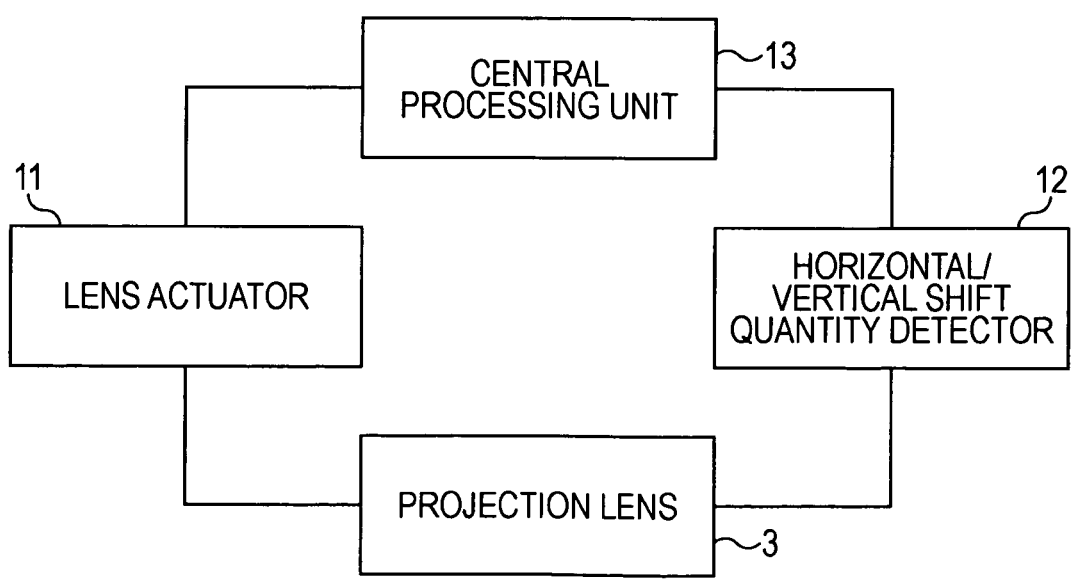
FIG. 2 is a functional block diagram showing a configuration of main parts of a liquid crystal projector according to an embodiment of the invention.

FIG. 2 is a functional block diagram showing a configuration of main parts of a liquid crystal projector according to an embodiment of the invention.

As shown in the figure, the liquid crystal projector 1 includes, in addition to the projection lens 3, a lens actuator 11, a horizontal/vertical shift quantity detector 12 and a central processing unit 13 (hereinafter referred to as "CPU").

The lens actuator 11 shifts the projection lens 3 two-dimensionally. That is, the lens actuator 11 is configured to shift the projection lens 3 vertically and horizontally in a plane normal to the projected optical axis relative to the apparatus body 2. This shift movement is performed by utilizing an actuation source such as a motor. However, at the lens actuator 11, the shift movement of the projection lens 3 is selectively performed so that the projection lens 3 is shifted in one axial direction which is selected from the vertical direction or the horizontal direction, and simultaneous actuation in two axial directions is not performed in this arrangement. Incidentally, the mechanisms, components, and the like for the shift movement of the projection lens 3, i.e., the detail configuration of the lens actuator 11, may be achieved by utilizing related art, and therefore the description thereof is omitted herein.

The horizontal/vertical shift quantity detector 12 detects the shift quantity (motion quantity) in the case where the lens actuator 11 shifts the projection lens 3. By this, it may be possible to obtain the current position of the projection lens 3. The detection of the shift quantity may be electrically performed on the basis of a change in a voltage value, the change in a voltage value being obtained by achieving, for example, the configuration in which the voltage value is varied in accordance with the shift movement of the projection lens 3 by using, for example, a variable resistor. However, the detection of the shift quantity may not be limited to the described arrangement, but it may be possible to electrically and mechanically detect the shift quantity by using other related art (for example, position detection mechanism utilizing photo-electronic sensors).

The CPU 13 executes a predetermined program, thereby controlling the shift movement of the projection lens 3 performed by the lens actuator 11. Specifically, as will be described in detail below, the CPU 13 controls the shift quantity when the lens actuator 11 shifts the projection lens 3, thereby limiting the range of the shift movement. That is, the CPU 13 serves as a shift controller for controlling the range of the shift movement by the lens actuator 11.

Incidentally, the predetermined program necessary for the control processing performed by the CPU 13 is preliminary installed in a storage device accessible by the CPU 13.

[Overview of Shift Movement]

Next, an example of a processing operation in the liquid crystal projector 1 as configured above, specifically, an example of control processing performed by the CPU 13 for determining the shift quantity when the lens actuator 11 shifts the projection lens 3, will be described.

FIG. 3 is an explanatory view showing an overview of an actuation control method according to an embodiment of the present invention.

In the liquid crystal projector 1, when the lens actuator 11 two-dimensionally shifts the projection lens 3, a movable range of the projection lens 3 describes a rectangular shape as shown in the figure. However, as already described, if the entire rectangular region is made to be a movable range, undesirable picture defects may occur.

To prevent the occurrence of the picture defects, it is thought that the movable range of the projection lens 3 may be limited within a circular region which is inscribed in the rectangular region as described above (for example, see Japanese Unexamined Patent Application Publication No. 2005-173460 as described above). However, the movable range of the shift movement of the projection lens 3 by the lens actuator 11 may be different depending on whether the projection lens 3 is shifted in the vertical direction or the horizontal direction, and the movable range in the horizontal direction is more likely to be narrower than that of the vertical direction. This is because the apparatus body 2 is generally positioned such that the position of the optical axis coincides with the horizontal center of the screen 4, and thus the shift movement in the horizontal direction is less likely performed. Therefore, as a limit range for preventing the occurrence of picture defects, it may be effective to adopt an elliptical shape but not a circular shape.

However, if the circular or the elliptical region is adopted as a limit range, complex arithmetic processing using a quadratic expression may be necessary for limiting the shift movement of the projection lens 3. Therefore, with respect to the shift movement of the projection lens 3, the control processing of the shift movement may not be easily performed with a simple configuration.

In the liquid crystal projector 1 having the above-described configuration which will be described in the present embodiment, when the CPU 13 controls the shift movement of the projection lens 3, the limit range of the shift movement is set to be within a quadrangle region 20 shown in FIG. 3. This quadrangle region 20 is the one in which the intersection point of diagonals is set to be located coaxially with the position of the optical axis of the apparatus body 2. More specifically, the quadrangle region 20 is a rhombus region which is set to be inscribed in the circular or elliptical region which is a limit range where no picture defects occur and also in the rectangular region which is a movable range of the projection lens 3. Here, the term "rhombus" refers to a parallelogram, the four side lengths of which are equal.

The quadrangle region 20 is specified on the basis of the limit range where no picture defects occur. The limit range where no picture defects occur may be determined with reference to the size (height and width) of the projection plane on the screen 4. For example, in the case of the vertical direction, the height of the projection plane is specified as 1V, and the range in which no picture defects occur is specified as 0.65V above and below the range specified by 1V (for example, see FIG. 1). Values for the range where no picture defects occur may be determined by actually projecting an optical image on the screen and performing shift movement, thereby confirming that no picture defects are generated. That is, it is thought that the setting of the specification and the verification thereof may be performed by an empirical method such as experimentation.

As described above, the CPU 13 limits the range of the shift movement of the projection lens 3 so that the center position of the projection lens 3 does not go outside of the quadrangle region 20 of which the intersection point of diagonals is coaxially located with the position of the optical axis of the apparatus body 2, the quadrangle region 20 being inscribed in the limit range where no picture defects occur. Therefore, a boundary between the quadrangle region 20 and the region outside thereof is defined by straight lines which are constituent sides of the quadrangle region 20. That is, since the arithmetic processing using a primary expression for the straight lines specifies the boundary, the processing load may be reduced as compared with the case where the arithmetic processing using a quadratic expression is used. Furthermore, since the quadrangle region 20 is inscribed in the limit range where no picture defects occur, if the limitation of shift movement is performed such that the projection lens 3 does not go outside of the quadrangle region 20, picture defects may not occur in the projected image on the screen 4.

[Description of Specific Procedures of Shift Control]

Next, specific procedures of control processing performed by the CPU 13 will be described.

Figure 4:
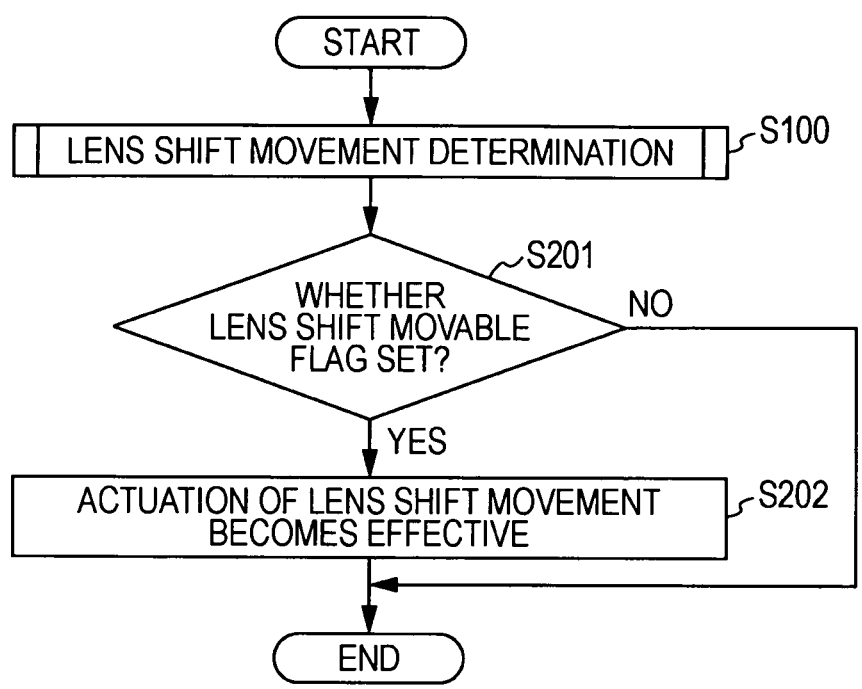
FIG. 4 is a flowchart showing one embodiment of a lens shift control.

FIG. 4 is a flow chart showing one example of a lens shift control.

In the liquid crystal projector 1, when lens shift movement is requested from a user interface section (not shown) of the liquid crystal projector 1 or at a predetermined periodic timing, the CPU 13 performs control processing as will be described below.

The CPU 13 obtains the current position of the projection lens 3 on the basis of a detected result by the horizontal/vertical shift quantity detector 12, and performs a lens shift movement determination process (STEP 100, hereinafter the "step" is referred to as "S"). In the lens shift movement determination process, as will be described in detail later, it is determined whether the shift movement of the projection lens 3 according to a requested movement direction and shift quantity is within the limit range or is out of the range. As a result, when the shift movement is determined to be out of the limit range, an alarm output or the like indicating such a fact is performed.

If the shift movement does not surpass the limit range, the CPU 13 determines whether a lens shift movable flag is set (S201), and if the lens shift movable flag is set, the CPU 13 causes the lens actuator 11 to actuate in order to achieve lens shift movement (S202). By this process, the projection lens 3 is shifted by the lens actuator 11 in the requested direction by the requested shift quantity.

Figure 5:
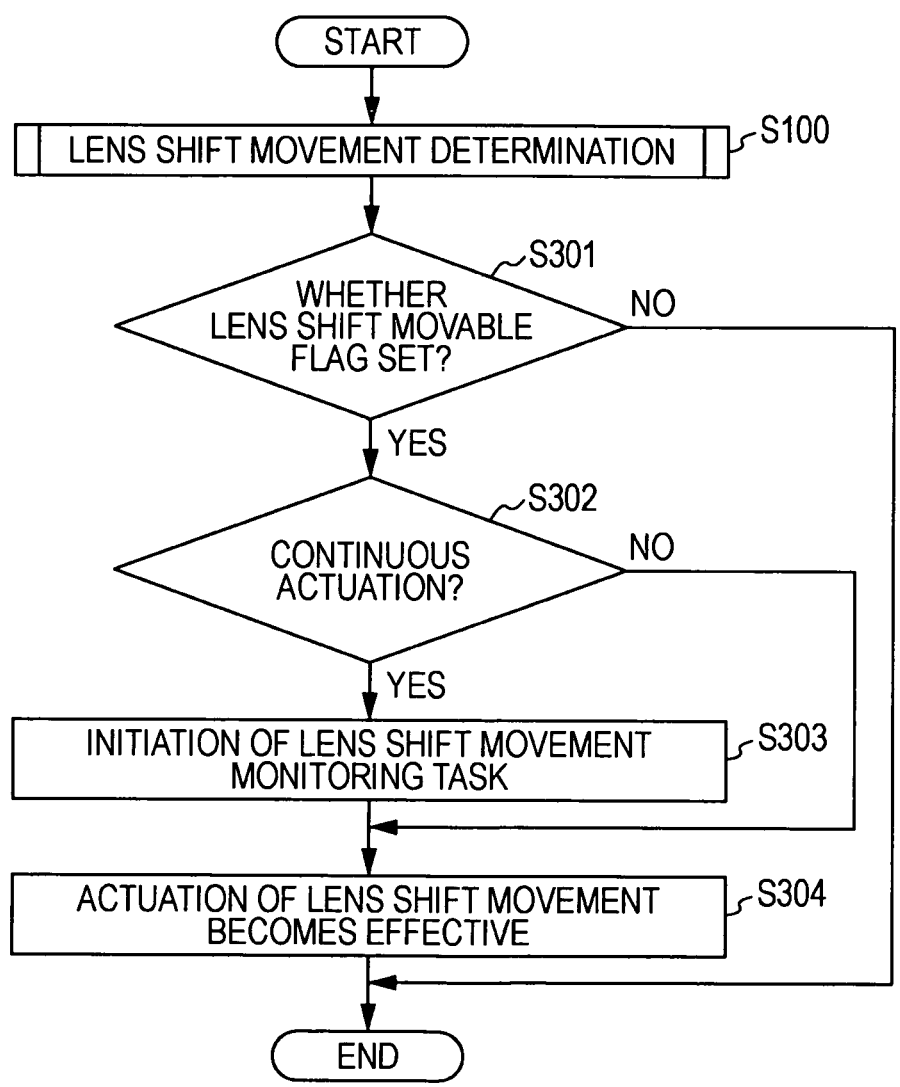
FIG. 5 is a flowchart showing another embodiment of a lens shift control.

FIG. 5 is a flow chart showing another example of a lens shift control.

The figure shows the case where the lens actuator 11 selectively responds to continuous actuation and discrete actuation. Here, the continuous actuation performs the actuation for continuous lens shift movement and continuously activates the output of the actuation source in the lens actuator 11. On the other hand, in the discrete actuation, the output of the actuation source in the lens actuator 11 is produced as a constant time pulse. For example, a remote controller, one of the user interface section of the liquid crystal projector 1, is operated so that the liquid crystal projector is shifted to a lens shift adjustment mode, and if a directional key is pressed once, the discrete actuation is set whereas if the key is continuously held down, continuous actuation is set.

In order to selectively respond to the continuous actuation and the discrete actuation, after the CPU 13 performs the lens shift movement determination process (S100), it determines whether or not the lens shift movable flag is set (S301), and if the lens shift movable flag is set, it then determines whether continuous actuation is requested (S302). This determination may be performed on the basis of information from the user interface section.

Further, when it is determined that the request is for continuous actuation, the CPU 13 initiates a lens shift movement monitoring task (S303). In the case of the continuous actuation, it may be necessary to initiate the task and then to constantly monitor the lens shift position. Incidentally, in the case of discrete actuation but not continuous actuation, the task is not initiated as in the example (see FIG. 4) described above.

Thereafter, the CPU 13 causes the lens actuator 11 to actuate in order to achieve lens shift movement (S304). By this process, the projection lens 3 is shifted by the lens actuator 11 in the requested direction by the requested shift quantity.

Next, the lens shift movement determination process (S100), which is one of the procedures of each process example as described above will be described.

Figure 6:
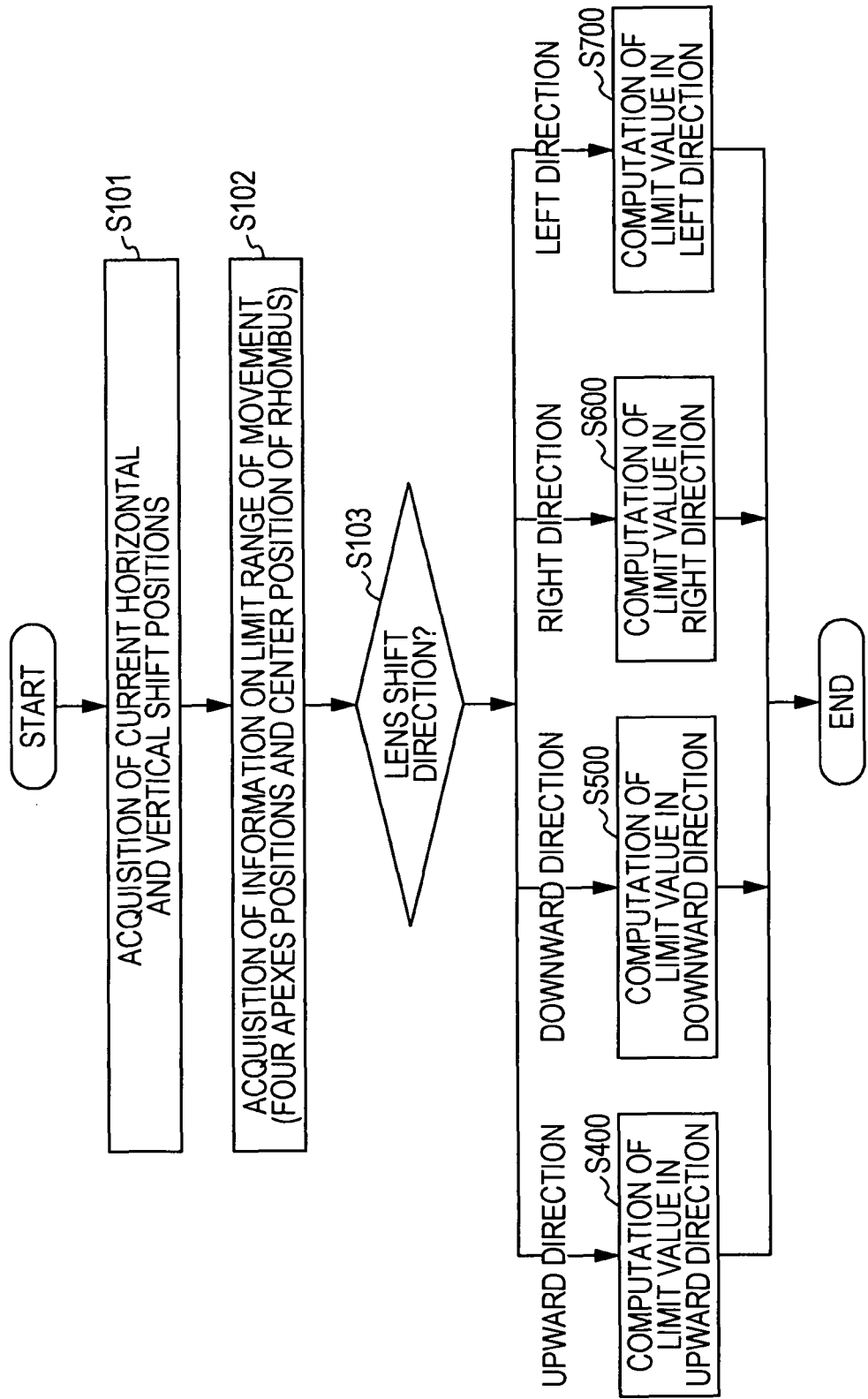
FIG. 6 is a flowchart showing one embodiment of a lens shift movement determination process.

FIG. 6 is a flow chart showing one example of the lens shift movement determination process.

On performing the lens shift movement determination process, the CPU 13 firstly acquires from the horizontal/vertical shift quantity detector 12, information on the current position of the projection lens 3, that is, the current horizontal shift position as well as the current vertical shift position (S101). On the other hand, the CPU 13 acquires information which specifies the limit range of the shift movement of the projection lens 3 (hereinafter referred to as "information on limit range of movement") (S102). The information on limit range of movement includes information which specifies the quadrangle region 20 corresponding to the limit range of the shift movement, specifically, information on coordinate values which specify the positions of four apexes and the center of a rhombus shape, which is the quadrangle region 20. The acquisition of the information on limit range of movement may be achieved by accessing a storage device in which the information on limit range of movement is preliminary set and stored.

Thereafter, the CPU 13 determines a requested movement direction in which the lens is shifted (S103). This determination may be performed on the basis of the information from the user interface section.

As a result, if the request is for an upward direction, the CPU 13 performs an upper limit value computation process (S400). If the request is for a downward direction, the CPU performs a lower limit value computation process (S500). If the request is for a right direction, the CPU 13 performs a right limit value computation process (S600). For the left direction, the CPU 13 performs a left limit value computation process (S700).

Here, information on the limit range of movement will be described with reference to specific examples.

Figure 7:
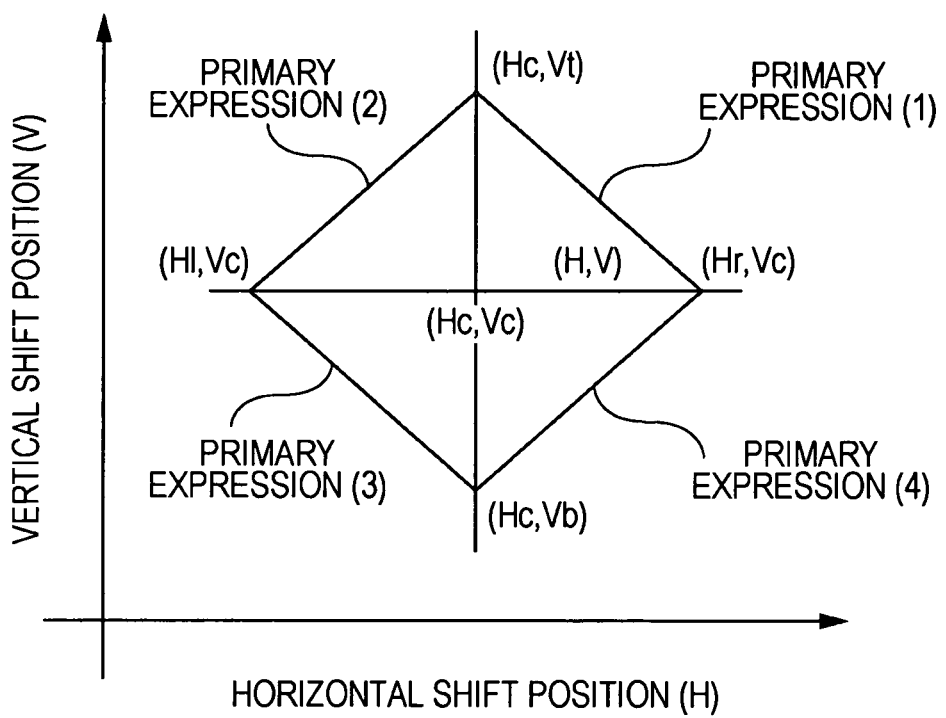
FIG. 7 is an explanatory view showing one embodiment of information on limit range of movement.

FIG. 7 is an explanatory view showing one example of information on limit range of movement.

As shown in the figure, information on the limit range of movement may be specified by coordinate values in the plane where the projection lens 3 is shifted vertically and horizontally. Specifically, the positions of the four apexes and the center of the rhombus, which is the quadrangle region 20 are specified by the following values:

Hc: the coordinate value of the horizontal shift position of the center of the rhombus; Hl: the coordinate value of the horizontal shift position of the left apex of the rhombus; Hr: the coordinate value of the horizontal shift position of the right apex of the rhombus; Vc: the coordinate value of the vertical shift position of the center of the rhombus; Vt: the coordinate value of the vertical shift position of the top apex of the rhombus; and Vb: the coordinate value of the vertical shift position of the bottom apex of the rhombus. Incidentally, the current horizontal shift position and the vertical shift position of the projection lens 3 are respectively represented by coordinate values H and V. These coordinate values may be represented by ADC (Analog to Digital Converter) values of 10 bits (0 to 1023).

As described above, when the positions of the four apexes and the center of the rhombus are specified, at the boundary between the rhombus region and the region outside thereof, the following relationship is established; that is, when $Hc \leq H \leq Hr$ and $Vc \leq V \leq Vt$ are true, $V=(Vt-Vc)/(Hr-Hc) \times H + (VtHr-VcHc)/(Hr-Hc)$ is established (primary expression (1)); when $Hl \leq H \leq Hc$ and $Vc \leq V \leq Vt$ are true, $V=(Vt-Vc)/(Hl-Hc) \times H + (VcHc-VtHl)/(Hc-Hl)$ is established (primary expression (2)); when $Hl \leq H \leq Hc$ and $Vb \leq V \leq Vc$ are true, $V=(Vb-Vc)/(Hl-Hc) \times H + (VcHc-VbHl)/(Hc-Hl)$ is established (primary expression (3)); and when $Hc \leq H \leq Hr$ and $Vb \leq V \leq Vc$ are true, $V=(Vb-Vc)/(Hr-Hc) \times H + (VbHr-VcHc)/(Hr-Hc)$ is established (primary expression (4)).

Next, the upper limit value computation process (S400) in the lens shift movement determination process (S100) will be described.

Figure 8A:
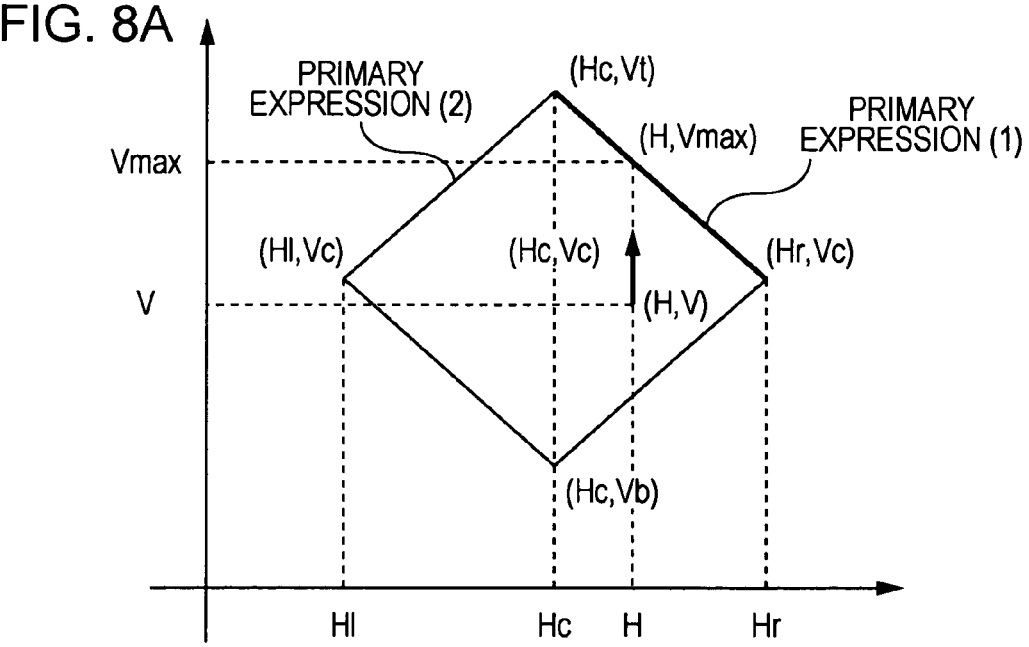
FIGS. 8A and 8B are an explanatory view and a flowchart, respectively, showing one embodiment of an upper limit value computation process.
Figure 8B:
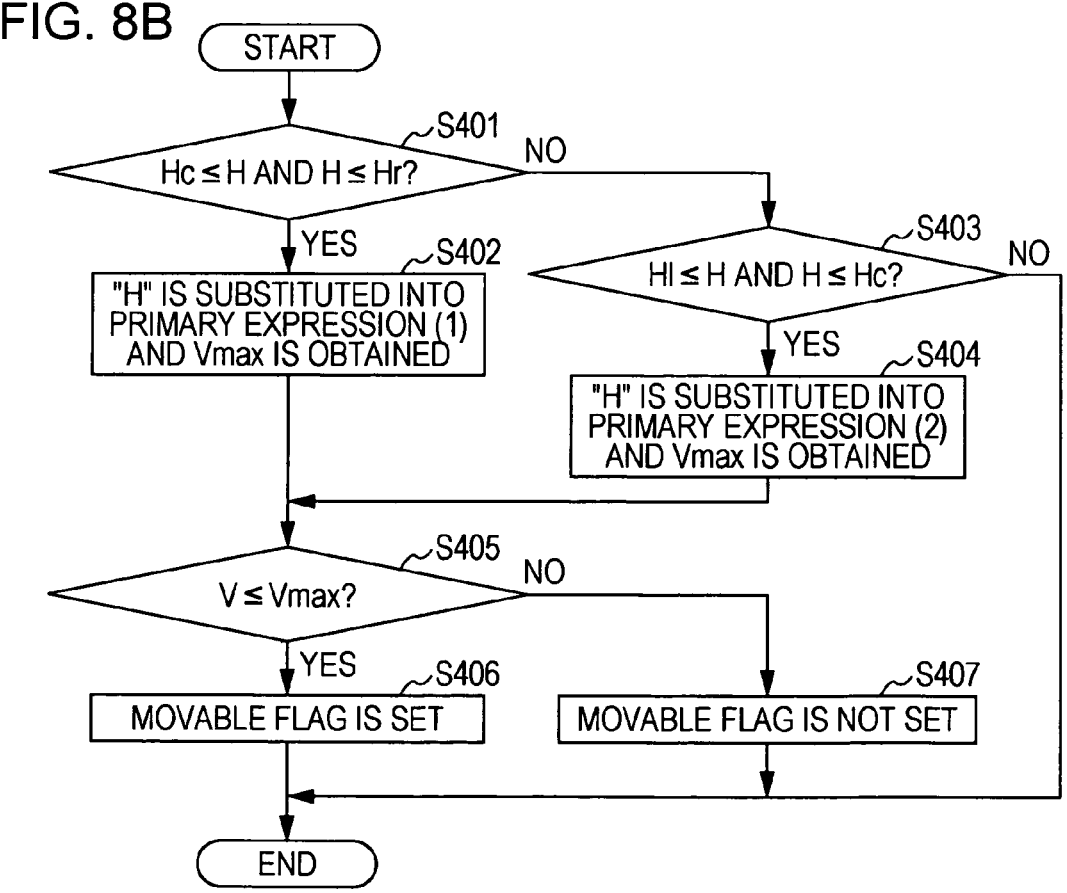

FIGS. 8A and 8B are an explanatory view and a flowchart, respectively, showing one embodiment of an upper limit value computation process.

In the upper limit value computation process, as shown in FIG. 8A, a limit value for the movement limit in an upward direction specified by the rhombus which is the quadrangle region 20 is computed.

For such a computation, as shown in FIG. 8B, the CPU 13 firstly determines whether or not $Hc \leq H$ and $H \leq Hr$ are true (S401), and if $Hc \leq H$ and $H \leq Hr$ are true, H is substituted into the first expression (1), whereby an upper limit value Vmax is obtained (S402). If $Hc \leq H$ and $H \leq Hr$ are not true, the CPU13 goes on to determine whether or not $Hl \leq H$ and $H \leq Hc$ are true (S403), and if $Hl \leq H$ and $H \leq Hc$ are true, H is substituted into the primary expression (2), whereby an upper limit value Vmax is obtained (S404).

When Vmax is obtained, the CPU13 determines whether or not $V \leq Vmax$ is true (S405). As a result, if $V \leq Vmax$ is true, the current vertical shift position V does not exceed the upper limit value Vmax and therefore is within the rhombus region. Thus, the CPU 13 sets a movable flag, and allows the shift movement of the projection lens 3 in an upward direction (S406). However, if $V \leq Vmax$ is not true, since the current vertical shift position V is already outside of the rhombus region, the CPU performs a predetermined process such as an alarm output or the like, without setting the movable flag (S407).

Next, the lower limit value computation process (S500) in the lens shift movement determination process (S100) will be described.

Figure 9A:
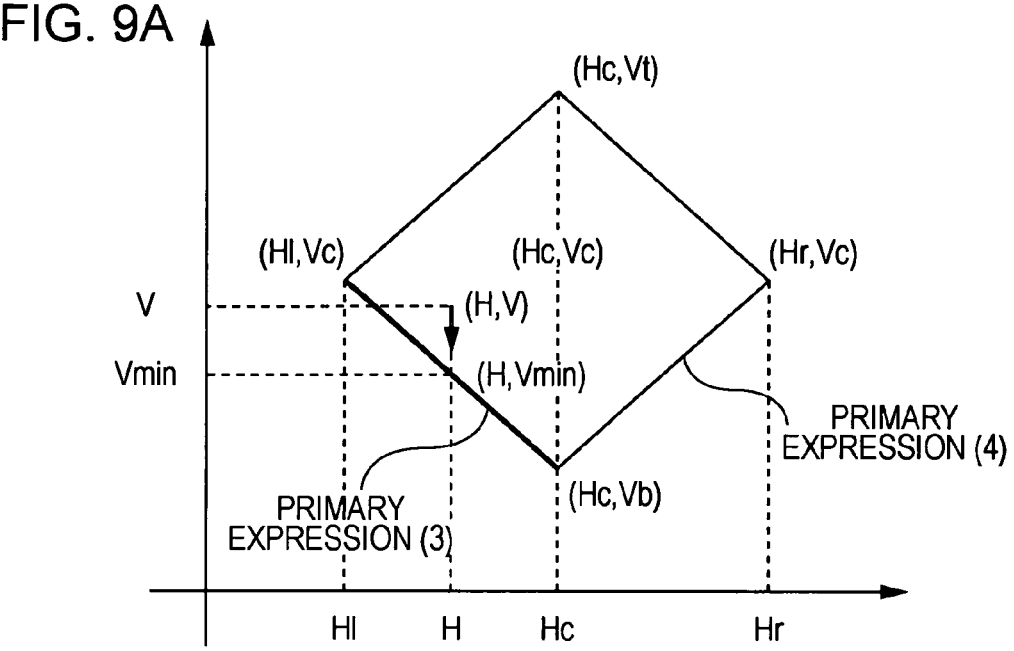
FIGS. 9A and 9B are an explanatory view and a flowchart, respectively, showing one embodiment of a lower limit value computation process.
Figure 9B:
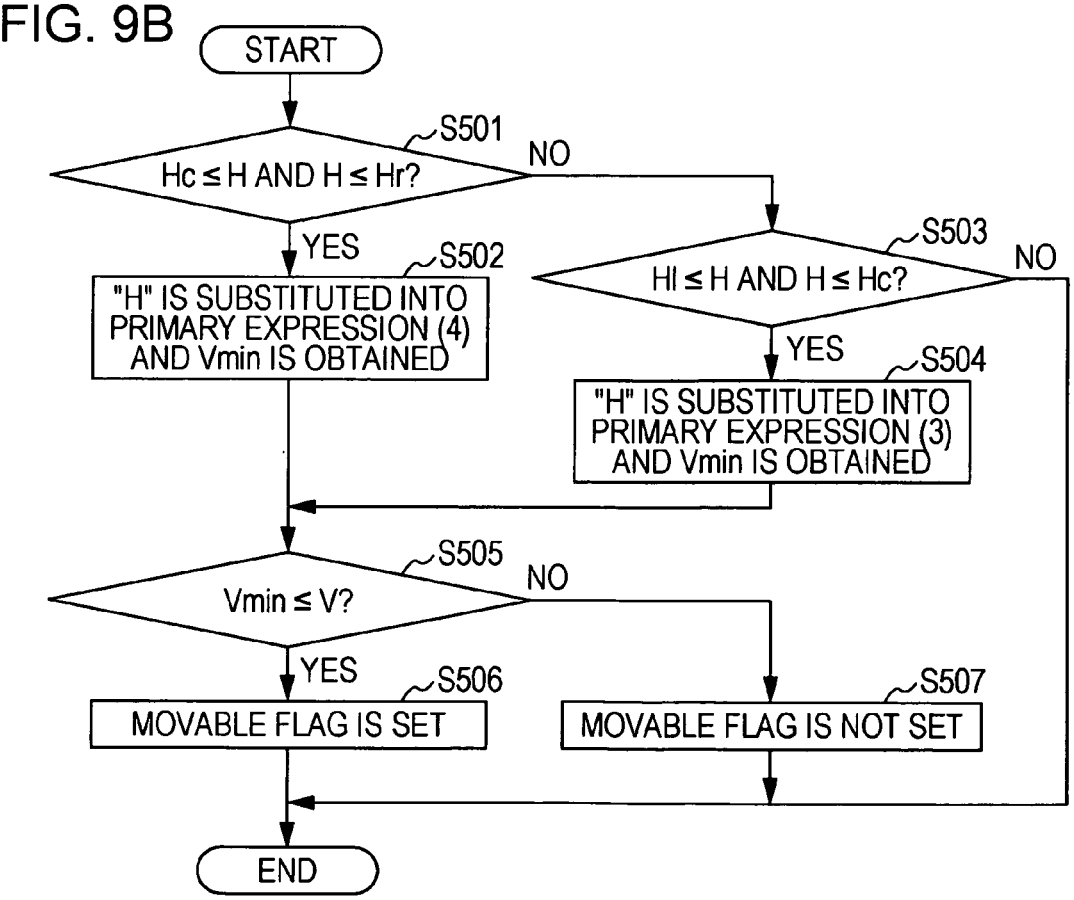

FIGS. 9A and 9B are an explanatory view and a flowchart, respectively, showing one embodiment of a lower limit value computation process.

In the lower limit value computation process, as shown in FIG. 9A, a limit value for the movement limit in a downward direction specified by the rhombus which is the quadrangle region 20 is computed.

For such a computation, as shown in FIG. 9B, the CPU 13 firstly determines whether or not $Hc \leq H$ and $H \leq Hr$ are true (S501), and if $Hc \leq H$ and $H \leq Hr$ are true, H is substituted into the first expression (4), whereby a lower limit value Vmin is obtained (S502). If $Hc \leq H$ and $H \leq Hr$ are not true, the CPU13 goes on to determine whether or not $Hl \leq H$ and $H \leq Hc$ are true (S503), and if $Hl \leq H$ and $H \leq Hc$ are true, H is substituted into the primary expression (3), whereby a lower limit value Vmin is obtained (S504).

When Vmin is obtained, the CPU13 determines whether or not $Vmin \leq V$ is true (S505). As a result, if $Vmin \leq V$ is true, the current vertical shift position V does not exceed the lower limit value Vmin and therefore is within the rhombus region. Thus, the CPU 13 sets a movable flag, and allows the shift movement of the projection lens 3 in a downward direction (S506). However, if $Vmin \leq V$ is not true, since the current vertical shift position V is already outside of the rhombus region, the CPU performs a predetermined process such as an alarm output or the like, without setting the movable flag (S507).

Next, a right limit value computation process (S600) in the lens shift movable determination process (S100) will be described.

Figure 10A:
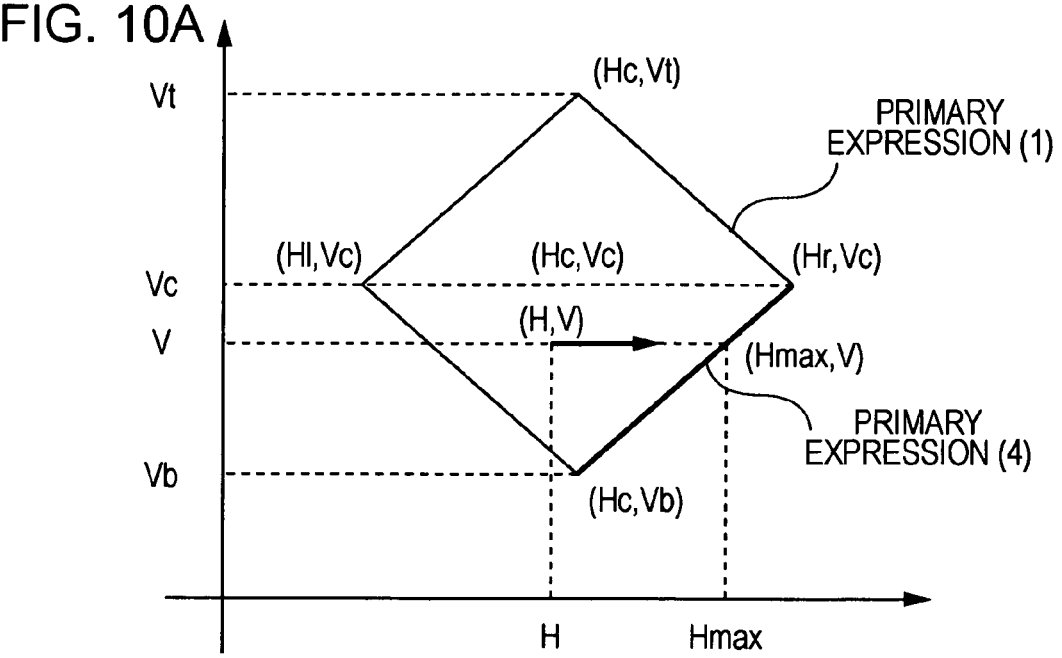
FIGS. 10A and 10B are an explanatory view and a flowchart, respectively, showing one embodiment of a right limit value computation process.
Figure 10B:
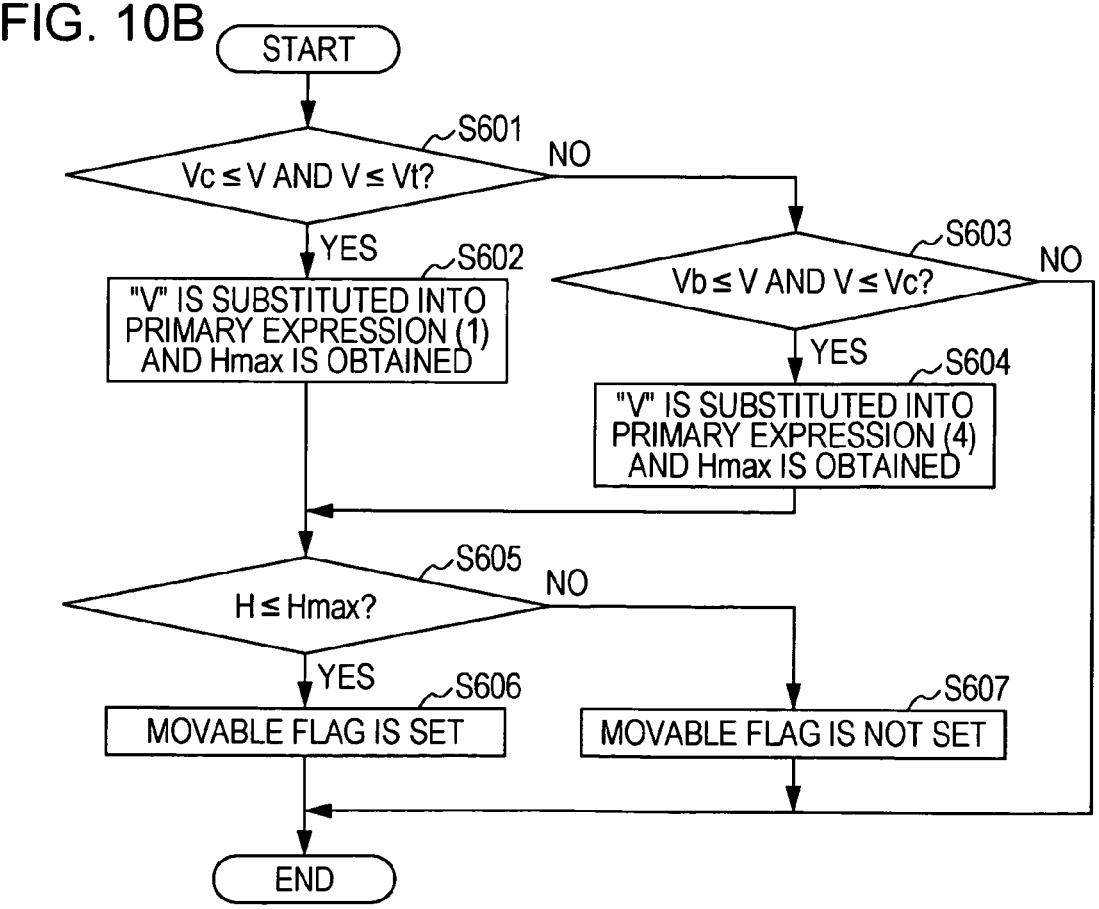

FIGS. 10A and 10B are an explanatory view and a flowchart, respectively, showing one embodiment of a right limit value computation process;

In the right limit value computation process, as shown in FIG. 10A, the limit value for the movement limit in a right direction specified by the rhombus which is the quadrangle region 20 is computed.

For such a computation, as shown in FIG. 10B, the CPU 13 firstly determines whether or not $Vc \leq V$ and $V \leq Vt$ are true (S601), and if $Vc \leq V$ and $V \leq Vt$ are true, V is substituted into the first expression (1), whereby a right limit value Hmax is obtained (S602). If $Vc \leq V$ and $V \leq Vt$ are not true, the CPU13 goes on to determine whether or not $Vb \leq V$ and $V \leq Vc$ are true (S603), and if $Vb \leq V$ and $V \leq Vc$ are true, V is substituted into the primary expression (4), whereby a right limit value Hmax is obtained (S604).

When Hmax is obtained, the CPU13 determines whether or not $H \leq Hmax$ is true (S605). As a result, if $H \leq Hmax$ is true, the current horizontal shift position H does not exceed the right limit value Hmax and therefore is within the rhombus region.

Thus, the CPU 13 sets a movable flag, and allows the shift movement of the projection lens 3 in a right direction (S606). However, if H≤Hmax is not true, since the current horizontal shift position H is already outside of the rhombus region, the CPU performs a predetermined process such as an alarm output or the like, without setting the movable flag (S607).

Next, a left limit value computation process (S700) in the lens shift movable determination process (S100) will be described.

Figure 11A:
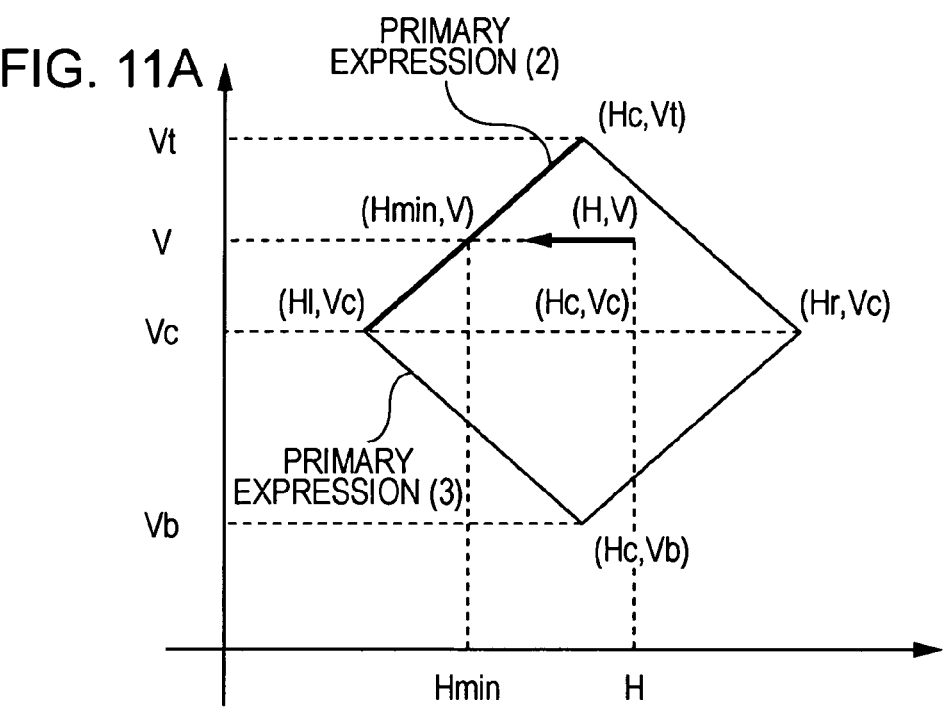
FIGS. 11A and 11B are an explanatory view and a flowchart, respectively, showing one embodiment of a left limit value computation process.
Figure 11B:
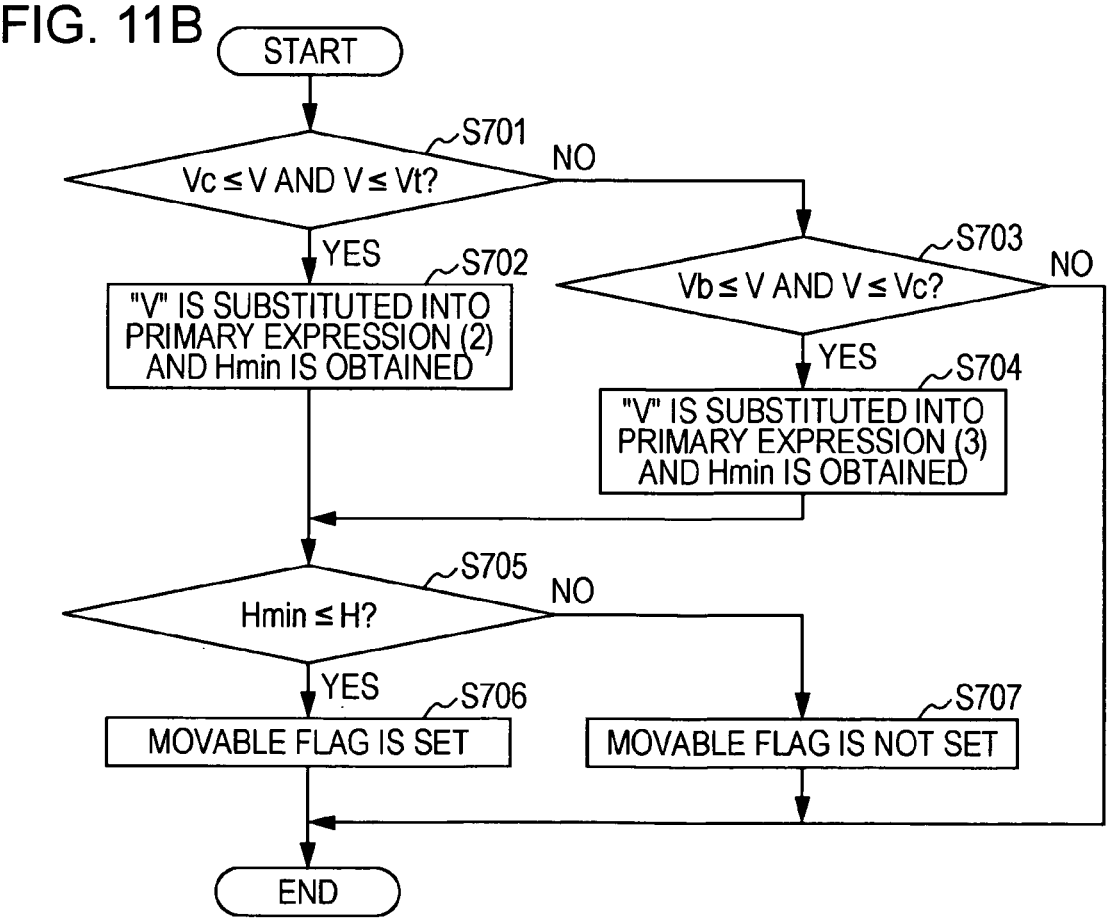

FIGS. 11A and 11B are an explanatory view and a flowchart, respectively, showing one embodiment of a left limit value computation process.

In the left limit value computation process, as shown in FIG. 11A, a limit value for the movement limit in a left direction specified by the rhombus which is the quadrangle region 20 is computed.

For such a computation, as shown in FIG. 11B, the CPU 13 firstly determines whether or not Vc≤V and V≤Vt are true (S701), and if Vc≤V and V≤Vt are true, V is substituted into the first expression (2), whereby a left limit value Hmin is obtained (S702). If Vc≤V and V≤Vt are not true, the CPU13 goes on to determine whether or not Vb≤V and V≤Vc are true (S703), and if Vb≤V and V≤Vc are true, V is substituted into the primary expression (3), whereby a left limit value Hmin is obtained (S704).

When Hmin is obtained, the CPU13 determines whether or not Hmin≤H is true (S705). As a result, if Hmin≤H is true, the current horizontal shift position H does not exceed the left limit value Hmin and therefore is within the rhombus region. Thus, the CPU 13 set a movable flag, and allows the shift movement of the projection lens 3 in a left direction (S706). However, if Hmin≤H is not true, since the current horizontal shift position H is already outside of the rhombus region, the CPU performs a predetermined process such as an alarm output or the like, without setting the movable flag (S707).

FIG. 12 is an explanatory view showing one example of a control embodiment of shift movement.

By undergoing the series of the control processing as described above, the CPU 13 controls the shift movement of the projection lens 3 such that the projection lens 3 may not be shifted from within the rhombus region which is the quadrangle region 20 to outside the rhombus region (see an arrow "A" in the Figure). Additionally, the CPU 13 controls the shift movement of the projection lens 3 such that the projection lens 3 may not be shifted from outside the rhombus region to outside the range thereof (see an "arrow B" in the figure). However, the CPU 13 controls the shift movement of the projection lens 3 such that the projection lens 3 may be shifted from outside the rhombus range to within the rhombus region (see an "arrow C" in the figure). Specifically, the CPU 13 performs control as to whether the shift movement may be allowed or not, depending on whether the current position exceeds the standards, i.e., the limit values Vmax, Hmax, Vmin, or Hmin, which are located at directions in which shift movement is performed. Thus, with respect to the direction opposite that in which the shift movement is performed, there may be no necessity to specify the limit values Vmax, Hmax, Vmin, and Hmin, and therefore it may be possible to omit the processing load for the limit values.

As described above, in the liquid crystal projector 1 and the actuation control method executed by the liquid crystal projector 1, the shift movement of the projection lens 3 is controlled with reference to the rhombus-shaped quadrangle region 20. That is, the CPU 13 which performs the control limits the range of the shift movement of the projection lens 3 by the lens actuator 11 such that the center position (H, V) of the projection lens 3 does not go outside of the quadrangle region 20 of which the intersection point of diagonals is axially located at the position of the optical axis (Hc, Vc) of the apparatus body 2.

Therefore, even in the case where the projection lens 3 is two-dimensionally shifted, it may be possible to perform control for such shift movement by arithmetic processing using a primary expression, and therefore it may be possible to reduce processing load as compared with the methods in the related art (the case where arithmetic processing using a quadratic expression may be necessary) which are based on a circular shape, elliptic shape, or the like. Further, since the processing load is reduced, control processing for the lens shift movement may be performed easily with a simple configuration. Specifically, due to the simplification of the controlling process, it may be possible to achieve a high-speed controlling process, and as a result, enhanced responsiveness for the shift movement may be expected. Additionally, since the CPU13 is not configured to be complex, it may be possible to reduce manufacturing cost of an apparatus while enhancing versatility, and therefore the embodiment has an advantage that it can be easily applied to an apparatus (system).

Further, in the liquid crystal projector 1 and the actuation control method thereof according to the embodiment, when shifting the projection lens 3 two-dimensionally, the lens actuator 11 selectively performs the shift movement of the projection lens 3 in one axial direction selected from either the vertical direction or the horizontal direction, and simultaneous actuation in two axial directions is not performed. In response to this, the CPU 13 which performs control for the shift movement limits the range of the shift movement by selectively going through the upper limit value computation process, lower limit value computation process, right limit value computation process, or left limit value computation process.

Therefore, with this configuration (the shift movement is performed in one axial direction, and no simultaneous actuation in two axial directions is performed), the control processing for lens shift movement may be easily performed with a simple configuration. Specifically, by performing shift movement in one axial direction basis, together with the limitation of the range of shift movement of the projection lens 3 with reference to the rectangular region 20, further simplification of the control processing, the configuration of the apparatus or the like may be expected.

Incidentally, although the preferred exemplary embodiments have been described above, the present invention is not limited to the contents thereof.

For example, in the described embodiments, the case where the quadrangle region 20 describes a rhombus shape is described. However, the present invention is not limited to this embodiment, but the other shapes, for example, a kite shape, may be employed. The kite shape refers to a graphic having four sides of which two pairs adjacent to each other are equal in length, and is different from the rhombus shape that has four equal sides in that the lengths of the sides of each pair of sides of the kite shape may be different. If the kite shape is adopted as the quadrangle region 20, it may be possible to deal with the case where a picture-defected range is asymmetrical.

Further, in the present embodiments, a liquid crystal projector is described as a projection display apparatus. However, the present invention may be applied to other projection display apparatuses such as an image display apparatus using a digital mirror device (DMD), if two-dimensional shift movement of the projection lens may be necessary.

The present invention is not limited to the described embodiments, but changes may be made without departing from the scope of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A projection display apparatus comprising:
   an apparatus body that forms an optical image projected on a screen;
   a projection lens that projects the optical image formed by the apparatus body on the screen;
   a lens actuator that allows the projection lens to be shifted in a vertical direction or in a horizontal direction relative to the apparatus body; and
   a shift controller that limits a range of shift movement by the lens actuator such that a center position of the projection lens does not go outside of a quadrangle region of which the intersection point of diagonals is located coaxially with the position of the optical axis of the apparatus body,
   the quadrangle region being set so as to be inscribed in an elliptical region representative of a limit range where no picture defects occur, in which the elliptical region is within a rectangular region representative of a movable range of the projection lens.

2. The projection display apparatus according to claim 1, wherein:
   the lens actuator selectively shifts the projection lens in one axial direction selected from either the vertical direction or the horizontal direction.

3. An actuation control method of a projection display apparatus that limits a range of shift movement of a projection lens projecting an optical image on a screen when the projection lens is shifted in a vertical direction or a horizontal direction relative to an apparatus body forming the optical image projected on the screen, the limitation being made such that a center position of the projection lens does not go outside of a quadrangle region of which the intersection point of diagonals is located coaxially with the position of the optical axis of the apparatus body,
   the quadrangle region being set so as to be inscribed in an elliptical region representative of a limit range where no picture defects occur, in which the elliptical region is within a rectangular region representative of a movable range of the projection lens.

4. The projection display apparatus according to claim 1, wherein the range of shift movement of the lens actuator permits the center position of the projection lens to be movable anywhere within the quadrangle region inscribed in the elliptical region.

5. The actuation control method according to claim 3, wherein the range of shift movement of the lens actuator permits the center position of the projection lens to be movable anywhere within the quadrangle region inscribed in the elliptical region.

6. A projection display apparatus comprising:
   an apparatus body that forms an optical image projected on a screen;
   a projection lens that projects the optical image formed by the apparatus body on the screen;
   a lens actuator that allows the projection lens to be shifted in a vertical direction or in a horizontal direction relative to the apparatus body; and
   a shift controller that limits a range of shift movement by the lens actuator such that a center position of the projection lens does not go outside of a quadrangle region of which the intersection point of diagonals is located coaxially with the position of the optical axis of the apparatus body,
   the quadrangle region being set so as to be inscribed in a elliptical region representative of a limit range where no picture defects occur, in which the elliptical region is within a rectangular region representative of a movable range of the projection lens,
   wherein the range of shift movement of the lens actuator permits the center position of the projection lens to be movable anywhere within the quadrangle region inscribed in the elliptical region.

* * * * *